3,300,439
SOLVENT SOLUTION OF AN ALKYLOL ETHYL-
ENICALLY UNSATURATED AMIDE COPOLY-
MER HAVING AT LEAST A PORTION OF SAID
ALKYLOL GROUPS ETHERIFIED WITH A MIX-
TURE OF A MONOHYDRIC ALCOHOL AND A
POLYHYDRIC ALCOHOL
Le Roy A. Chloupek, Prospect Heights, and Kazys Sek-
makas, Chicago, Ill., assignors to De Soto Chemical
Coatings, Inc. Chicago, Ill., a corporation of Delaware
No Drawing. Filed May 1, 1963, Ser. No. 277,095
5 Claims. (Cl. 260—33.4)

The present invention relates to new alkylolated acryl-
amide interpolymers in which at least some of the amido
hydrogen atoms are replaced by an alkylol group etheri-
fied with a polyhydric alcohol. The new interpolymers
are especially useful in organic solvent solution coating
compositions either as the sole film-forming resin or in
admixture with other resins, particularly those containing
hydroxyl groups such as alkyd resins, aminoplast resins
and hydroxy-containing addition copolymers.

Alkylolated acrylamide interpolymers of the type used
in the invention are well known. We have found that it is
preferable to produce an alkylolated interpolymer which
is substantially unetherified so that the number of reac-
tive alkylol groups available for cross-linking is kept at a
maximum to provide storage stable resins which cure
rapidly at elevated temperature. Unfortunately, these
unetherified interpolymers must be produced in solution
in non-alcoholic solvents having no capacity for etherifica-
tion, such as methyl ethyl ketone or 2-ethoxy ethanol ace-
tate, to maintain the unetherified condition of the alkylol
group. These solvents are more costly than solvent sys-
tems comprising xylene or other aromatic hydrocarbon
together with a small proportion of monohydric alcohol.

When the less expensive solvent systems including a
monohydric alcohol is used, the alkylol group is etherified
by the monohydric alcohol. Unfortunately, extensive
etherification with monohydric alcohol blocks the alkylol
group making the curing reaction sluggish because the
etherifying alcohol must be driven off to release the al-
kylol group before the curing reaction can take place.

The alcohols previously utilized were monohydric alco-
hols. It seems that polyhydric alcohols were avoided
either because one would expect these materials to cross-
link and gel the system or because the art was misled
into believing that most of the alkylol groups had to be
blocked to obtain storage stability which is not, in fact,
the case, especially when alkylolation and interpolym-
erization take place simultaneously in the presence of
an alkaline catalyst.

The present invention is directed to an alkylolated
acrylamide interpolymer which is etherified at least in part
with a polyhydric alcohol so that the etherification which
results from the use of desirable hydroxy-containing
solvents causes only a minimum decrease in interpolymer
reactivity. The interpolymer ether produced in the
presence of polyhydric alcohol retains a reactive group,
e.g., the remaining hydroxyl functionality of the poly-
hydric alcohol for cross-linking cure upon baking. More-
over, and since the polyhydric alcohols have a higher
boiling point than butanol, for example, etherification with
polyhydric alcohol is preferential to etherification with
monohydric alcohol under the reflux conditions normally
used for interpolymer production. The presence of
polyhydric alcohol in accordance with the invention does
not cause gelation or the formation of insoluble gel par-
ticles in the reaction mixture.

In accordance with the invention, an amide of an ethyl-
enically unsaturated carboxylic acid, preferably an acryl-
amide, is copolymerized with other polymerizable ethyl-
enically unsaturated materials, preferably including mono-
mers containing the $CH_2=C<$ group, to produce a non-
gelled, solvent-soluble copolymer or interpolymer. At
least a portion of the amido hydrogen atoms in the inter-
polymer are replaced by the structure

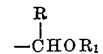

wherein R is selected from the group consisting of hy-
drogen, furyl and aromatic and saturated lower aliphatic
hydrocarbon radicals containing up to 10 carbon atoms,
and $R_1$ is the hydroxy-containing etherification residue of
a polyhydric alcohol. Preferably, R is hydrogen and $R_1$
is the monohydric etherification residue to a saturated
aliphatic dihydric alcohol, e.g., a glycol.

As will be more fully appreciated hereinafter, con-
siderable variation is permissible in the kind and ratio
of ethylenically unsaturated materials which are used,
the aldehyde modifying agent, and the extent of etherifica-
tion. Moreover, there is also a considerable variation
which can be made in the specific nature of the etherifying
agent which is used.

While it is preferred to employed acrylamide in propor-
tions of from 2–50%, preferably from 2–30% by weight,
based on the total weight of interpolymer, the invention
is not limited to acrylamide or to the presence of a termi-
nal methylene group. Thus, other acrylamide monomers
such as methacrylamide and itaconate diamide may be
used. Indeed, amides of other unsaturated acids such as
maleic acid diamide, fumaric acid diamide, sorbic acid
amide and muconic acid diamide may less desirably be
used.

While the preferred unsaturated monomers inter-
polymerized with acrylamide do contain the $CH_2=C<$
group and it is preferred to use combinations of the mono-
mers which form hard polymers such as styrene, vinyl
toluene and methacrylate, and monomers which form soft
polymers such as monoethylenically unsaturated car-
boxylic acid esters having a terminal aliphatic hydrocar-
bon group containing from 2–20 carbon atoms, illustrated
by ethyl acrylate, butyl acrylate, 2-ethylhexyl acrylate,
and stearyl acrylate, the invention is not restricted to the
selection of monomers containing the $CH_2=C<$ group
or to the selection of preferred combinations of mono-
mers. Thus, monomers which do not contain the $$CH_2=C<$$

group may be interpolymerized with acrylamide either
alone or in the presence of monomers which do con-
tain the $CH_2=C<$ group. Particular attention is directed
to maleic acid or anhydride, maleic acid monoesters
and diesters, butene-2 and fatty acids containing con-
jugated unsaturation such as dehydrated castor oil fatty
acids which are useful in the production of interpolymers
with acrylamide. Still other monomers which may be
used are acrylic acid, methacrylic acid, 1,3-butadiene,
vinyl ethers such as n-butyl vinyl ether, gycidyl meth-
acrylate, etc.

Non-monomeric ethylenically unsaturated materials
may also be used as is illustrated by polyethylenically
unsaturated polyester resins such as those disclosed in the
copending application of Kazys Sekmakas, Serial No.
115,330, filed June 6, 1961, now Patent No. 3,163,615,
granted December 29, 1964, the disclosure of which is
hereby incorporated by reference.

Unsaturated epoxy resins may also be used in accord-
ance with the invention, these resins being illustrated by
epoxidized polyolefins containing extensive unsaturation
as is produced by the polymerization of a polyunsaturated
olefin such as butadiene or isoprene either alone or in
admixture or together with minor proportions of mono-
ethylenically unsaturated monomers such as butene-1, ethylene, propylene, styrene, vinyl toluene, etc., as is illustrated in the copending application of Kazys Sekmakas, Serial No. 217,263, filed August 16, 1962, now Patent No. 3,222,321, granted December 7, 1965, the disclosure of which is hereby incorporated by reference.

With respect to interpolymer production, it is preferred, as disclosed in the prior application of Kazys Sekmakas, Serial No. 100,804, filed April 5, 1961, now Patent No. 3,163,623, granted December 29, 1964, the disclosure of which is hereby incorporated by reference, to carry out the addition polymerization reaction at the same time that the aldehyde component is reacted with amido hydrogen atoms. In other words, polymerization and alkylolation may advantageously be accomplished at the same time and in a single stage. A basic catalyst is desirably used as taught in said prior application. Also, and in the absence of any significant proportion of vinyl monomer other than acrylamide, and especially when the acrylamide component is used in small amount, the single stage polymerization and alkylolation may be carried out without gelation in the absence of a basic catalyst. When polymerization and alkylolation are effected simultaneously, the alkylolated interpolymers possess excellent storage stability when etherified to an extent less than 50%, including the complete absence of etherification, and reasonably reactive systems may be provided which are etherified up to 75%.

Any free-radical generating polymerization catalyst may be used for the solution copolymerization in accordance with the invention, the selection of catalyst being determined by the desired temperature of the polymerization reaction. The important point is that the agent liberate free radicals under the conditions of polymerization so that the addition polymerization is facilitated. The class of free-radical generating polymerization catalysts is too well known to require elucidation except to point out that typical catalysts are illustrated in the examples.

The aldehyde modifying agent is desirably used in an amount of from 0.2–5 equivalents of aldehyde, and preferably in an amount of from 1–4 equivalents of aldehyde for each amide group used in the formation of the acrylamide interpolymer. The preferred aldehyde is formaldehyde. Other monoaldehydes, including acetaldehyde, propionaldehyde, butyraldehyde, benzaldehyde, and furfural can also be used. Substances yielding an aldehyde, such as paraformaldehyde, hexamethylene tetramine or trioxymethylene can also be used, paraformaldehyde being preferred.

Etherification of the aldehyde-modified amide may broadly be carried out up to 100% of the alkylol radicals present in the interpolymer though it is preferred to reduce etherification to a minimum, as by leaving the water of etherification in the system to stop the etherification reaction. Any polyhydric alcohol or mixtures thereof may be used for etherification though saturated polyhydric alcohols are preferred, especially when etherification is simultaneous with interpolymerization. Moreover, glycols are particularly preferred. It should be noted in passing that unsaturated polyhydric materials are incorporated into the interpolymer by addition polymerization and this is not harmful, though it considerably reduces the capacity for etherification. Polyhydric alcohols useful in the present invention are illustrated by ethylene glycol; propylene glycol; 1,4-butanediol; diethylene glycol; dipropylene glycol; glycerine; pentaerythritol; 1,6-hexanediol; sorbitol; etc. Various other aliphatic saturated polyhydric materials such as partial esters and partial ethers of polyhydric compounds may also be used and these are illustrated by coconut oil fatty acid monoester of glycerine, linseed oil fatty acid monoester of glycerine, glycerol monobutyl ether, etc.

While it is preferred to have little or no etherification, some etherification is not readily avoided because of the desirability of using inexpensive alcohol-containing solvent systems in the production of the acrylamide interpolymer. Accordingly, a feature of the invention is the use of polyhydric alcohols together with monohydric alcohols in order to reduce the blocking action of the monohydric alcohol.

Thus, and while the total etherifying agent may be constituted by the polyhydric alcohol, varying amounts of monohydric alcohols may also be present in the system. These monohydric alcohols are illustrated by butanol and ethoxy and butoxy ethanol which are desirably used because of their excellent solvent action. The presence of the polyhydric alcohol is helpful in amounts in excess of 5% by weight, based on the total weight of hydroxy etherifying agents present in the system.

Generally speaking, the polyhydric alcohol has a higher boiling point than the monohydric alcohol. Thus, using a mixture of monohydric and polyhydric alcohols and under the usual reflux conditions, a preferential reaction occurs between the polyhydric alcohol and the alkylol group as the monohydric alcohol is continuously being refluxed. Accordingly, and where a mixture is used, the polyhydric alcohol will enter into the etherification reaction in preference to the lower boiling monohydric alcohol and the blocking action of the monohydric alcohol is minimized. Of course, and since only limited etherification is desired, the reaction is preferably also controlled by leaving the water of etherification in the system to reduce overall etherification.

It is desired to point out that conventional practice in the production of alkylolated acrylamide interpolymers is effected using an alcohol such as butanol together with an aldehyde, such as formaldehyde, which is introduced into the system in solution in butanol. In this conventional process, a significant proportion of water is normally present in the formaldehyde-butanol solution which is used. The proportion of water introduced as indicated is excessive since the reactions are conducted in organic solvent medium. As a result, the selection of butanol or other alcohol in which water is immiscible is an important feature of conventional practice since the use of butanol enables the removal of water from the system, butanol and water being removed from the system by refluxing, and only butanol being returned. The use of a system in which water is continuously removed encourages the etherification reaction and this is undesirable. Moreover, the need for solvent recycling and water removal complicates the process which is also undesirable.

The invention prefers to employ an agent such as paraformaldehyde, which can be introduced into the organic solution system without the introduction of extraneous water. Using paraformaldehyde, there is no need to remove water from the system, and this feature permits the elimination of water insoluble alcohols such as butanol, and the fact that water is not continuously removed minimizes etherification. Accordingly, and in the invention, the preferred monohydric alcohols which are used as solvents are water miscible solvents such as alkoxy alkanols, these being also miscible with the polyhydric alcohols which are featured in the invention.

The utilization of paraformaldehyde and water miscible solvents is of particular importance when, as is true in preferred practice of the invention, interpolymerization, alkylolation, and etherification are all effected at the same time and in a single stage.

While the interpolymers of the present invention are importantly useful alone in organic solvent solution coating compositions, they also exhibit excellent compatibility with other film-forming resinous materials, and are desirably applied in admixture therewith, the term "admixture" including partial pre-reaction between the respective components which are blended together. In this regard, excellent compatibility is exhibited with heat-hardening, solvent-soluble polymethylol compounds including ureaformaldehyde condensates and melamine-formaldehyde condensates as well as aldehyde condensates with other triazines, such as benzoguanamine, all of the foregoing falling generally within the heading of aminoplast resins. Good compatibility with other film-forming resins extends to alkyd resins, epoxy resins and vinyl resins. Also, the resinous materials may be employed alone, or in combination with one another.

Of special note in connection with the present invention and as features thereof, excellent compatibility exists with hexamethylol melamine and hydroxy-containing addition copolymers illustrated particularly by copolymers of vinyl chloride and vinyl acetate which have been partially hydrolyzed or saponified to convert a portion of the vinyl acetate groups to hydroxy groups. The hydroxyl group provided in the addition copolymer referred to and in the hexamethylol melamine is highly reactive with the amido alkylol group of the acrylamide interpolymer to provide a rapid cure at elevated temperature producing insoluble coatings characterized by unusual flexibility coupled with significant hardness, properties which are normally antagonistic with respect to one another. Preferred copolymers contain from 80–92% by weight of vinyl chloride, with the balance of the copolymer being essentially vinyl acetate, and with a portion of the vinyl acetate converted to vinyl alcohol to provide a vinyl alcohol content of from 2–10% by weight, preferably from 3–8% by weight.

In the provision of blends in accordance with the invention, the proportions of the resinous materials which are blended may vary over the weight range of from 5:95 to 95:5. Preferably, the acrylamide interpolymer is used in proportions of from 20–90%, based on the weight of the mixture of resinous materials, and most preferably the acrylamide interpolymer is present in a major proportion of from 50–90%, based on the total weight of resinous material, especially when the acrylamide content of the interpolymer is in the range of from 2–20%, based on the weight of the interpolymer.

The particular nature of the organic solvent used for the solution copolymerization or for the solvent solution application of the interpolymers is not a critical aspect of the invention. While butanol, preferably in admixture with xylol may be used as a solvent system, it is preferred to use other specific solvents such as toluene, methyl ethyl ketone, methyl isobutyl ketone, acetone, butyl acetate, 2-ethoxy ethanol, 2-butoxy ethanol, etc., the preferred solvents being methyl ethyl ketone and 2-ethoxy ethanol. Methyl ethyl ketone is particularly preferred when the sole etherifying agent is the polyhydric alcohol to provide low viscosity, high solids content solutions.

It will be understood that the invention is illustrated, but not limited by the specific examples presented hereinafter. It will also be evident that the products of the invention, while useful in diverse types of heat-hardening resinous compositions are primarily useful in the coating art, in which event, they are applied either alone or in combination with the other resinous materials listed hereinbefore, from a compatible organic solvent solution. These coating solutions may be pigmented or contain dyes, flow control agents, waxes and various other components as will be evident to those skilled in the art.

In the examples which follow, all parts are by weight, unless otherwise indicated.

EXAMPLE 1

*Preparation of acrylamide interpolymer in the presence of ethylene glycol and alkoxy alkanols*

Interploymer composition: Percent
Acrylamide _____ 8
Styrene _____ 30
Methyl methacrylate _____ 5
Unsaturated polyester resin of Note I _____ 20
Ethyl acrylate _____ 27
2-ethylhexyl acrylate _____ 10

Charge composition: Parts by weight
Aromatic hydrocarbon solvent (boiling range 145–195° C.) _____ 200
2-butoxy ethanol _____ 150
Paraformaldehyde _____ 75
2-ethylhexyl acrylate _____ 100
Acrylamide _____ 80
2-ethoxy ethanol _____ 400
Ethylene glycol _____ 120
Triethyl amine _____ 3
Styrene _____ 300
Methyl methacrylate _____ 50
Unsaturated polyester resin of Note I (80% non-volatile solids in aromatic hydrocarbon solvent—boiling range 145–195° C.) _____ 250
Ethyl acrylate _____ 270
Di-tertiary-butyl peroxide _____ 6
Azobisbutyronitrile _____ 6
Benzoyl peroxide _____ 2
Tertiary dodecyl mercaptan _____ 12
Cumene hydro peroxide _____ 6

Procedure of preparation:

Charge into a reactor equipped with an agitator, heating mantel, reflux condenser, thermometer, and nitrogen inlet tube 200 parts of the aromatic hydrocarbon solvent, 150 parts of 2-butoxy ethanol, 75 parts of paraformaldehyde and heat to 240° F.

In a separate container, premix the other monomers and catalysts except the cumene hydro peroxide, and add the mixture to the reactor continuously over 2½ hours under constant agitation at 250–260° F. Continue heating the reaction mixture for 4 hours. Add 3 parts of cumene hydro peroxide after 4 hours and 3 parts after 6 hours. Hold for monomer conversion (8–9 hours).

Final characteristics of interpolymer:
Solids (percent) _____ 53.0
Viscosity (Gardner) _____ W–X
Color (Gardner) _____ 2–3

*Note I.—Preparation of unsaturated polyester resin*

Charge into a reactor equipped with an agitator, heating mantel, Dean-Stark trap, thermometer, and nitrogen inlet tube 790 grams of dehydrated castor oil fatty acids, 250 grams of crotonic acid, 785 grams of glycerine, 400 grams of isophthalic acid, and 50 grams xylol as reflux solvent. Heat the mixture to 420° F. and hold for an acid value of 5.0. Cool the reaction mixture to 380° F. and add 240 grams of a technical grade of 1,1'-isopropylidenebis(p-phenyleneoxy)di-2-propanol, 160 grams of phthalic anhydride and 255 grams of azelaic acid. Heat to 420° F. and hold for an acid value of 13–15. Add 510 grams of an aromatic hydrocarbon solvent (boiling range 145–195° C.) to 80% solids.

Final characteristics of the polyester resin:
Solids (percent) _____ 79.7
Viscosity (Gardner) _____ $Z_1$–$Z_2$
Color (Gardner) _____ 3–4
Acid value (non-volatile matter) _____ 13.7

EXAMPLE 2

*Preparation of arcylamide interpolymer in the presence of paraformaldehyde and ethylene glycol as the sole etherifying agent*

Monomer composition: Percent
Acrylamide _____ 13.0
Styrene _____ 86.4
Glacial methacrylic acid _____ 0.6

Charge composition: Parts by weight
Methyl ethyl ketone _____ 1,000
Acrylamide _____ 130
Styrene _____ 864
Glacial methacrylic acid _____ 6
Azobisbutyronitrile _____ 6

| | |
|---|---|
| Benzoyl peroxide | 6 |
| Tertiary dodecyl mercaptan | 30 |
| Cumene hydro peroxide | 6 |
| Ethylene glycol | 180 |
| Paraformaldehyde powder | 90 |
| Triethyl amine | 3 |

Procedure of preparation:

Charge into a reactor equipped with heating mantel, agitator, thermometer, nitrogen inlet tube and reflux condenser, 1,000 parts of methyl ethyl ketone and 130 parts of acrylamide and dissolve using agitation. Then add to the reaction mixture 864 parts of styrene, 6 parts of glacial methacrylic acid, 6 parts of azobisbutyronitrile, 6 parts of benzoyl peroxide and 30 parts of tertiary dodecyl mercaptan. Heat the reaction mixture to 190°–200° F. and hold for 8 hours. Add 6 parts cumene hydro peroxide and hold for monomer conversion (49–50% solids). Then add 90 parts of paraformaldehyde powder and 180 parts of ethylene glycol and 3 parts of triethyl amine and heat to 190° F. and hold for 2 hours.

Final characteristics of the interpolymer:

| | |
|---|---|
| Solids (percent) | 49.5 |
| Viscosity (Gardner) | E–F |
| Color (Gardner) | 4–5 |

EXAMPLE 3

Monomer composition:

| | Percent |
|---|---|
| Acrylamide | 8 |
| Styrene | 30 |
| Methyl methacrylate | 4.5 |
| Glacial methacrylic acid | 0.5 |
| Unsaturated polyester of Note I | 20.0 |
| Ethyl acrylate | 27 |
| Butyl acrylate | 10 |

Charge composition:

| | Parts by weight |
|---|---|
| Aromatic hydrocarbon solvent (boiling range 145–195° C.) | 250 |
| 2-butoxy ethanol | 150 |
| Paraformaldehyde | 75 |
| Butyl acrylate | 100 |
| Acrylamide | 80 |
| 2-butoxy ethanol | 400 |
| Ethylene glycol | 90 |
| Triethyl amine | 3 |
| Styrene | 300 |
| Methyl methacrylate | 45 |
| Glacial methacrylic acid | 5 |
| Polyester of Note I (80% solids in aromatic hydrocarbon solvent—boiling range 145–195° C.) | 250 |
| Ethyl acrylate | 270 |
| Azobisbutyronitrile | 6 |
| Di-tertiary-butyl peroxide | 6 |
| Benzoyl peroxide | 2 |
| Tertiary dodecyl mercaptan | 11 |
| Cumene hydro peroxide | 6 |
| 2-methoxy ethanol | 145 |

The same procedure of preparation is used as is described in Example 2.

Final characteristics of the polymer:

| | |
|---|---|
| Solids (percent) | 49.3 |
| Viscosity (Gardner) | X–Y |
| Color (Gardner) | 2 |

A high gloss enamel containing the interpolymer of Example 3 is prepared using the following composition: 28% titanium dioxide, 32% nonvolatile resin of Example 3.

The enamel is drawn down on chromate treated aluminum with a #38 wire wound rod and baked for one minute at 500° F. The following results are obtained:

| | |
|---|---|
| Gloss | 84. |
| Mar resistance | Good. |
| Pencil hardness | HB. |
| Reverse impact | Pass 50 inch/pounds. |
| Chill reverse impact at 40° F., 30, 40 and 50 inch/pounds | Passed. |
| 60-second toluol resistance | Passed. |
| Adhesion | Very good. |

As the above results illustrate, the coatings prepared utilizing the arcylamide interpolymer prepared in the presence of polyhydric alcohols in accordance with the invention exhibit good flexibility, impact, adhesion, and curing properties.

EXAMPLE 4

Example 3 is repeated replacing 25% of the resin solids used in this example with a corresponding weight of the following resin solutions:

(1) A benzoguanamine-formaldehyde resin which is a condensation product of 4 mols of formaldehyde with 1 mol of benzoguanamine in the presence of excess butanol and an acid catalyst to provide a heat-hardenable resin etherified with butanol to provide solvent solubility. The resin is utilized as a 60% resin solids solution of benzoguanamine-formaldehyde resin in a 50/50 weight ratio mixture of butanol/xylol.

(2) A butylated melamine-formaldehyde resin which is a condensation product of 5.5 mols of formaldehyde with 1 mol of melamine in the presence of excess butanol and formic acid catalyst to provide a solvent-soluble heat-hardening resin. The melamine-formaldehyde resin is used in the form of a 50% solids solution in 40/10 butanol/xylol solvent mixture which exhibits the following physical characteristics:

| | |
|---|---|
| Viscosity | 320 centipoises. |
| Mineral spirits tolerance | 9.5/1 (95 cc./10 grams). |
| Acid number | Less than 1.0. |

(3) A butylated urea-formaldehyde resin which is a condensation product of 2.2 mols of formaldehyde with 1 mole of urea in the presence of excess butanol and oxalic acid catalyst to provide a solvent-soluble heat-hardening resin. The urea-formaldehyde resin is used in the form of a 54% solids solution in 40/10 butanol/xylol solvent mixture which exhibits the following physical characteristics:

| | |
|---|---|
| Viscosity | 460 centipoises. |
| Mineral spirits tolerance | 25 cc./10 grams resin. |

(4) Methyl ether of hexamethylol melamine.

(5) A vinyl chloride-vinyl acetate copolymer containing 91% vinyl chloride, 3% vinyl acetate and 6% vinyl alcohol and having an intrinsic viscosity in 1% cyclohexanone at 20° C. of 0.57.

In each instance, an improved cure is noted by the achievement of insoluble films having increased hardness.

The invention is defined in the claims which follow.

We claim:

1. An organic solvent solution comprising an organic solvent including aromatic hydrocarbon solvent, saturated aliphatic monohydric alcohol, and saturated aliphatic polyhydric alcohol having dissolved therein a heat-hardening, non-gelled interpolymer comprising:

(A) 2–50% by weight based on the weight of the interpolymer, of an amide of ethylenically unsaturated carboxylic acid; and (B) other ethylenically unsaturated material copolymerizable with said amide;

said interpolymer having at least some amido-hydrogen atoms replaced with alkylol groups and at least some of said alkylol groups being etherified with a mixture of saturated aliphatic monohydric alcohol and saturated aliphatic polyhydric alcohol forming part of said organic solvent.

2. An organic solvent solution as recited in claim 1 in which said alkylol groups are methylol groups and said amide is acrylamide.

3. An interpolymer as recited in claim 1 in which said polyhydric alcohol is a glycol.

4. An interpolymer as recited in claim 3 in which said glycol is ethylene glycol.

5. An interpolymer as recited in claim 1 in which said alkylol groups are etherified to an extent of less than 50%.

References Cited by the Examiner
UNITED STATES PATENTS

| | | | |
|---|---|---|---|
| 2,132,671 | 10/1938 | Bauer | 260—72 |
| 2,340,907 | 2/1944 | Sussman et al. | 260—33.4 |
| 2,780,610 | 2/1957 | Barber et al. | 260—33.4 |
| 2,978,437 | 4/1961 | Christenson | 260—72 |
| 3,109,750 | 11/1963 | Roche | 260—32.8 |

MURRAY TILLMAN, *Primary Examiner.*

J. C. BLEUTGE, *Assistant Examiner.*